(12) United States Patent
Simell et al.

(10) Patent No.: US 12,305,124 B2
(45) Date of Patent: May 20, 2025

(54) METHOD AND APPARATUS FOR PRODUCING HYDROCARBON PRODUCT AND USE

(71) Applicant: TEKNOLOGIAN TUTKIMUSKESKUS VTT OY, Espoo (FI)

(72) Inventors: Pekka Simell, Espoo (FI); Muhammad Qureshi, Espoo (FI); Elmeri Pienihaekkinen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 133 days.

(21) Appl. No.: 18/248,004

(22) PCT Filed: Oct. 21, 2021

(86) PCT No.: PCT/FI2021/050703
§ 371 (c)(1),
(2) Date: Apr. 5, 2023

(87) PCT Pub. No.: WO2022/090613
PCT Pub. Date: May 5, 2022

(65) Prior Publication Data
US 2023/0374393 A1 Nov. 23, 2023

(30) Foreign Application Priority Data
Oct. 26, 2020 (FI) ..................................... 20206057

(51) Int. Cl.
*C10G 1/10* (2006.01)
*B01J 8/24* (2006.01)
(Continued)

(52) U.S. Cl.
CPC ................................. *C10G 1/10* (2013.01);
*B01J 8/24* (2013.01); *C10B 49/10* (2013.01);
*C10B 53/07* (2013.01);
(Continued)

(58) Field of Classification Search
None
See application file for complete search history.

(56) References Cited

U.S. PATENT DOCUMENTS

| 5,136,117 A | 8/1992 | Paisley et al. |
| 5,364,995 A | 11/1994 | Kirkwood et al. |

(Continued)

FOREIGN PATENT DOCUMENTS

| EP | 0502618 A1 | 9/1992 |
| JP | S59111815 A | 6/1984 |

(Continued)

OTHER PUBLICATIONS

Finnish Patent and Registration Office, Search Report Issued in U.S. Appl. No. 20/206,057, filed May 25, 2021, 1 page.

(Continued)

*Primary Examiner* — Tam M Nguyen
(74) *Attorney, Agent, or Firm* — McCoy Russell LLP

(57) ABSTRACT

The invention relates to a method and an apparatus for producing a hydrocarbons product from plastic containing material, wherein the plastic containing material is subjected into a pyrolysis reactor, steam is fed into the pyrolysis reactor, and the plastic containing material is pyrolyzed in the presence of the steam by using a catalytic pyrolysis with a mildly acidic catalyst comprising at least aluminium oxide, aluminium silicate, zirconium oxide or their combinations to convert the plastic containing material to the hydrocarbon product comprising wax. Further, the invention relates to the use of the product obtained by the method.

11 Claims, 1 Drawing Sheet

(51) Int. Cl.
    *C10B 49/10*     (2006.01)
    *C10B 53/07*     (2006.01)
    *C10B 55/06*     (2006.01)
    *C10B 57/12*     (2006.01)

(52) U.S. Cl.
    CPC ...... C10B 57/12 (2013.01); *C10G 2300/1003* (2013.01); *C10G 2300/807* (2013.01)

(56) References Cited

U.S. PATENT DOCUMENTS

| | | | |
|---|---|---|---|
| 5,432,259 | A | 7/1995 | Schottle et al. |
| 5,481,052 | A | 1/1996 | Hardman et al. |
| 2012/0310023 | A1* | 12/2012 | Huang ............. C10G 1/002 585/241 |
| 2014/0228606 | A1* | 8/2014 | Narayanaswamy ..... B01J 29/40 585/241 |
| 2016/0045841 | A1* | 2/2016 | Kaplan ............. C01B 32/05 429/49 |
| 2019/0119191 | A1* | 4/2019 | Streiff ................. C10G 1/10 |
| 2019/0161683 | A1* | 5/2019 | Narayanaswamy ... C10G 69/14 |
| 2019/0367428 | A1* | 12/2019 | Ramamurthy ........... C07C 4/06 |
| 2020/0017772 | A1* | 1/2020 | Ramamurthy ........... C07C 2/66 |
| 2020/0369965 | A1* | 11/2020 | Bitting .................. C10G 9/28 |
| 2020/0369966 | A1* | 11/2020 | Bitting .................. C10G 9/20 |

FOREIGN PATENT DOCUMENTS

| | | |
|---|---|---|
| WO | 2017167947 A1 | 10/2017 |
| WO | 2017167948 A1 | 10/2017 |
| WO | 2021214384 A1 | 10/2021 |

OTHER PUBLICATIONS

ISA European Patent Office, International Search Report Issued in Application No. PCT/FI2021/050703, Jan. 27, 2022, WIPO, 6 pages.

* cited by examiner

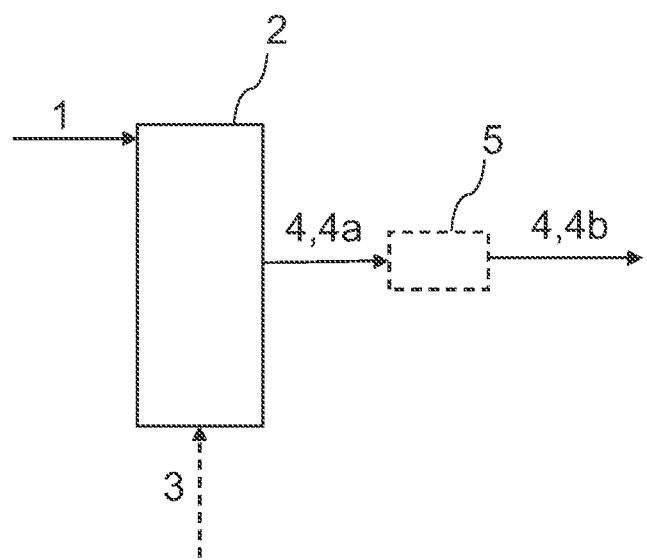

METHOD AND APPARATUS FOR PRODUCING HYDROCARBON PRODUCT AND USE

CROSS REFERENCE TO RELATED APPLICATIONS

The present application is a U.S. National Phase of International Application No. PCT/FI2021/050703 entitled "METHOD AND APPARATUS FOR PRODUCING HYDROCARBON PRODUCT AND USE," and filed on Oct. 21, 2021. International Application No. PCT/FI2021/050703 claims priority to Finnish Patent Application No. 20206057 filed on Oct. 26, 2020. The entire contents of each of the above-listed applications are hereby incorporated by reference for all purposes.

FIELD

The application relates to a method and an apparatus defined in for producing a hydrocarbon product from plastic containing material.

BACKGROUND

Known from the prior art is to produce liquid products from different raw materials in a pyrolysis process. The raw materials, e.g. polymer containing materials, can be converted to products by applying a catalytic pyrolysis. The catalytic processes are typically based on acidic catalysts, e.g. zeolites. They result in a production of soot (carbon) and relatively low yields of desired oil or wax products. Further, when the raw material comprises chlorine or bromine the pyrolysis product has to be cleaned from these impurities before utilization of the product.

OBJECTIVE

The objective is to solve the above problems. Further, the objective is to disclose a new type of method and apparatus for treating plastic containing waste. Further, the objective is to produce desired hydrocarbon product, such as wax, by the pyrolysis. Further, the objective is to improve yield of wax hydrocarbon products.

SUMMARY

The method and apparatus and use are characterized by what are presented in the claims.

In the method and apparatus, a hydrocarbon product is produced from plastic containing material by a catalytic pyrolysis.

BRIEF DESCRIPTION OF THE DRAWING

The accompanying drawing, which is included to provide a further understanding of the invention and constitutes a part of this specification, illustrates some embodiments of the invention and together with the description help to explain the principles of the invention. In the drawing:

FIG. 1 is a flow chart illustration of a process according to one embodiment.

DETAILED DESCRIPTION

In a method for producing a hydrocarbon product from plastic containing material, the method comprises steps: subjecting the plastic containing material (1) into a pyrolysis reactor (2), feeding steam (3) into the pyrolysis reactor, and pyrolyzing the plastic containing material in the presence of the steam by using a catalytic pyrolysis with a mildly acidic catalyst comprising at least aluminium oxide, aluminium silicate, zirconium oxide or their combinations, i.e. at least one of group consisting of aluminium oxide, aluminium silicate, zirconium oxide or their combinations, to convert the plastic containing material to the hydrocarbon product (4) comprising wax.

An apparatus for producing the hydrocarbon product from plastic containing material comprises a pyrolysis reactor (2) which comprises a mildly acidic catalyst comprising at least aluminium oxide, aluminium silicate, zirconium oxide or their combinations and in which the plastic containing material (1) is pyrolyzed in the presence of the steam by using a catalytic pyrolysis with the mildly acidic catalyst to convert the plastic containing material (1) to the hydrocarbon product (4) comprising wax, and at least one inlet for subjecting the plastic containing material (1) into the pyrolysis reactor (2), and at least one feeding device for feeding the steam (3) into the pyrolysis reactor (2).

Some embodiments of the method and the apparatus are shown in FIG. 1.

In this context, the plastic containing material (1) means any material, recycled material, residue material or waste material, which contains plastic, plastic type material, polymers, e.g. plastic type polymers, mixtures of plastics and/or polymers or the like. In one embodiment, the plastic containing material is selected from the group consisting of recycled plastic containing material, plastic containing waste, plastic containing residue material and their combinations. The plastic containing material can comprise one or more components. The plastic containing material can comprise also other materials than plastic, polymers or plastic type materials.

In one embodiment, the plastic containing material (1) may comprise polyethylene, polypropylene, PVC, other plastics, other polymer components, or their combinations. In one embodiment, the plastic containing material may comprise impurities. In one embodiment, the plastic containing material comprises impurities including chlorine, bromine and/or sulfur. In one embodiment, the mildly acidic catalyst is tolerant to impurities in the plastic containing material.

In this context, the hydrocarbon product (4) comprising wax means any product which is formed by the catalytic pyrolysis with the mildly acidic catalyst and which may comprise different hydrocarbons, e.g. higher than C18 hydrocarbons. Preferably, the hydrocarbon product comprises at least wax or wax based components. In this context, the wax means any wax or wax based material, e.g. paraffin wax. In one embodiment, the wax is paraffin wax. Further, the hydrocarbon product (4) may comprise other hydrocarbons, e.g. liquid hydrocarbons, gaseous hydrocarbons and/or char. The hydrocarbon product can consist of one or more components. In one embodiment, the hydrocarbon product comprises hydrocarbons, such as liquid hydrocarbons. In one embodiment, the hydrocarbon product comprises at least the wax and the liquid hydrocarbons. In one embodiment, the hydrocarbon product comprises the liquid hydrocarbons, gas, wax and char. In one embodiment, the hydrocarbon product comprising the wax is recovered. In one embodiment, the hydrocarbon product comprising liquid hydrocarbons is recovered. In one embodiment, the hydrocarbon product can contain 40-90 wt-% wax, in one embodiment 60-85 wt-% wax.

In this context, the mildly acidic catalyst means any catalyst which comprising at least aluminium oxide, aluminium silicate, zirconium oxide or their combinations. The aluminium oxide is a chemical compound of aluminium and oxide, such as alumina, $Al_2O_3$. The zirconium oxide is a chemical compound of zirconium and oxygen, such as zirconium dioxide, $ZrO_2$, zirconia. The aluminium silicate is derived from aluminium oxide and silicon dioxide ($SiO_2$), and its chemical formulae may be $xAl_2O_3 \cdot ySiO_2 \cdot zH_2O$, e.g. $Al_2O_3 \cdot SiO_2$, $Al_2O_3 \cdot 2SiO_2 \cdot 2H_2O$, $Al_2O_3 \cdot 2SiO_2$, $3Al_2O_3 \cdot 2SiO_2$ or $2Al_2O_3 \cdot SiO_2$. The term "catalyst" may be used later in this context to describe the mildly acidic catalyst. Preferably, the catalyst may be mildly acidic. In one embodiment, the catalyst contains $Al_2O_3$ to form an $Al_2O_3$ catalyst. In one embodiment, the $Al_2O_3$ catalyst is formed from sandblast material. In one embodiment, the catalyst contains aluminium silicate formed from aluminium oxide and silicon dioxide to form an aluminium silicate catalyst. In one embodiment, the catalyst contains $ZrO_2$ to form a $ZrO_2$ catalyst. In one embodiment, the mildly acidic catalyst is selected from the group consisting of the $Al_2O_3$ catalyst, aluminium silicate catalyst, $ZrO_2$ catalyst or their combinations. In one embodiment, the catalyst has a low surface area, e.g. below 10 $m^2/g$. The mildly acidic catalyst can be used as such or as a mixture with sand. In one embodiment, the catalyst of the pyrolysis reactor comprises the mildly acidic catalyst. In one embodiment, the catalyst of the pyrolysis reactor comprises the mildly acidic catalyst and sand. The catalyst is preferably tolerant to impurities in the plastic containing material. Then this catalytic pryrolysis process is suitable also for contaminated plastic waste. Further, the mildly acidic catalyst acts as a cracking catalyst enhancing a decomposition of the long chain primary pyrolysis products. Thus, the mildly acidic catalyst has following properties in the catalytic pyrolysis in the presence of steam: the catalyst depolymerizes the pyrolysis products, the catalyst prevents further reaction of the intermediate products because steam is added to the pyrolysis process, and the catalyst freezes the decomposition of the intermediate products to heavy hydrocarbon containing wax.

In one embodiment, the steam (3) is fed from a bottom of the pyrolysis reactor (2). In one apparatus embodiment, the steam (3) is arranged to be fed via a bottom of the pyrolysis reactor (2) into the pyrolysis reactor (2). In one embodiment, the apparatus comprises a distribution device, e.g. plate, plate with holes, grate, baffle or the like, to distribute the steam in the pyrolysis reactor.

In one embodiment, the mildly acidic catalyst comprising at least aluminium oxide, aluminium silicate, zirconium oxide or their combinations is fed into the pyrolysis reactor. In one embodiment, the mildly acidic catalyst is added as a fresh makeup catalyst feed into the pyrolysis reactor. In one embodiment, the apparatus comprises at least one catalyst feeding device for feeding the mildly acidic catalyst into the pyrolysis reactor. The catalyst feeding device can be selected from any suitable feeding device, feeder or similar device known per se. In one embodiment, the used mildly acidic catalyst which flows out from the pyrolysis reactor and/or which is recovered from the pyrolysis reactor is recirculated back to the pyrolysis reactor, e.g. directly or via reforming. In one embodiment, the used mildly acidic catalyst is discharged and/or recovered from filters, cyclones or the like, in which solids are separated from the product or product vapors, after the pyrolysis reactor. In one embodiment, the mildly acidic catalyst is discharged and/or recovered from the bottom of the pyrolysis reactor, e.g. by means of a screw.

In one embodiment, the plastic containing material (1) and the steam (3) are mixed to form a mixture in the pyrolysis reactor (2). In one embodiment, the plastic containing material (1) and the steam (3) can get mixed in the pyrolysis reactor. It is important that the catalytic pyrolysis with the mildly acidic catalyst is carried out in presence of the steam. The steam present in the gas phase reacts with the intermediate pyrolysis hydrocarbon products, which in the relatively mild conditions stops the depolymerization.

In one embodiment, temperature is 450-650° C., in one embodiment 500-600° C., in one embodiment 550-620° C., and in one embodiment 480-550° C., during the catalytic pyrolysis in the pyrolysis reactor (2).

In one embodiment, residence time is 0.5-3.0 seconds in the catalytic pyrolysis. In one embodiment, the residence time is 1 or over 1 seconds in the catalytic pyrolysis. In one embodiment, the residence time is 1.0-2.8 seconds in the catalytic pyrolysis.

In one embodiment, the pyrolysis reactor (2) is a fluidized bed reactor. In one embodiment, the pyrolysis reactor (2) is a bubbling fluidized bed reactor. In one embodiment, the pyrolysis reactor (2) is a circulating fluidized bed reactor. Alternatively, any suitable pyrolysis reactor can be used. In one embodiment, the reactor comprises a bed material. Any suitable bed material may be used.

A fluidizing gas is used in the fluidized bed reactor. In one embodiment, the fluidizing gas is subjected to the pyrolysis reactor (2). In one embodiment, the steam (3) is used at least partly as the fluidizing gas. In one embodiment, the fluidizing gas is a composition containing the steam and nitrogen. Further, in one embodiment, the fluidizing gas may comprise other components. In one embodiment, nitrogen is used as the fluidizing gas. In one embodiment, the fluidizing gas comprises the steam. In one embodiment, the steam is added to the fluidizing gas. Adding the steam to the fluidizing gas results in improved wax yield and quality. In one embodiment, the fluidizing gas comprises below 50 vol-% steam, in one embodiment below 30 vol-%, in one embodiment below 25 vol-% and in one embodiment below 20 vol-% steam. In one embodiment, the fluidizing gas comprises 0.1-30 vol-% steam, in one embodiment 1-25 vol-% and in one embodiment 5-20 vol-% steam. In one embodiment, the fluidizing gas and the steam are subjected separately into the pyrolysis reactor.

In one embodiment, heat to the catalytic pyrolysis and/or catalyst bed is provided indirectly by heating the catalyst material and/or steam in another device.

In one embodiment, the hydrocarbon product (4) is mainly in the gaseous form (4a) after the pyrolysis reactor (2), and the gaseous product is condensed in a condenser (5).

In one embodiment, the inlet for subjecting the plastic containing material (1) into the pyrolysis reactor (2) may be selected from any suitable inlet known per se, e.g. pipe, port or the like. In one embodiment, the plastic containing material is fed using a screw feeder to the pyrolysis reactor. Alternatively, any suitable feeder can be used to feed the plastic containing material to the pyrolysis reactor. In one embodiment, the feeder is selected from a screw feeder, silo feeder, hydraulic feeder, pneumatic feeder, melt feeder and their combinations.

In one embodiment, the feeding device, such as steam feeding device, for feeding the steam into the pyrolysis reactor (2) may be selected from any suitable feeding device, feeder or similar device known per se. In one embodiment, the steam can be supplied to the pyrolysis reactor by means of a steam generator and pipe. In one embodiment, the steam is fed through a grid.

Further, in one embodiment, the apparatus comprises at least one outlet for discharging the hydrocarbon product (4) from the pyrolysis reactor (2). The outlet may be any suitable outlet known per se, e.g. pipe, outlet port or the like.

In one embodiment, the hydrocarbon product (4) can be treated, post-treated or supplied to a next process or a next process step after the catalytic pyrolysis. In one embodiment, the wax is recovered and/or treated after the catalytic pyrolysis. In one embodiment, the hydrocarbon product is treated by a synthesis or a refinery process to form a final product after the pyrolysis reactor.

In one embodiment, the method and apparatus are based on a continuous process.

In one embodiment, the method and apparatus can be used to produce the wax and other hydrocarbons. The wax can be used as a raw material in final products. In one embodiment, the hydrocarbon product comprising wax or the wax is used as a raw material in a production of paint, resins, gaskets, techno chemical products, plastics, solvents, plasticizers, or their combinations. Further, the hydrocarbons can be used to form middle distillates, fuels, monomers or chemicals, for feed to refinery, polymerization or material manufacturing, or to their combinations.

Thanks to the invention, the high yield of wax products can be obtained. Further, quality of the products can be improved. Different plastic containing materials can be used as raw material. The catalytic pyrolysis with the mildly acidic catalyst is suitable to treat also contaminated plastic waste as the catalyst tolerates common impurities, like halogenides and sulfur.

The method and apparatus offer a possibility to produce wax hydrocarbon product from plastic containing materials with good properties easily, and energy- and cost-effectively. The present invention provides an industrially applicable, simple and affordable way to produce desired pyrolysis wax products from different plastic containing materials. The method and apparatus are easy and simple to realize in connection with production processes. Thus, the present invention improves waste plastic recycling and makes waste plastic utilization more feasible and versatile.

EXAMPLES

FIG. 1 presents some embodiments of the process for producing a hydrocarbon product comprising wax from plastic containing material (1).

The apparatus comprises a fluidized bed pyrolysis reactor (2) which comprises a mildly acidic catalyst, such as $Al_2O_3$, $ZrO_2$, aluminium silicate or their combinations, and in which the plastic containing material (1) is pyrolyzed in the presence of the steam by using a catalytic pyrolysis with said catalyst. The plastic containing material comprises at least one plastic or plastic type polymer. Alternatively, the plastic containing material is a mixture of different plastics and/or polymers. The apparatus comprises at least one inlet for subjecting the plastic containing material (1) into the pyrolysis reactor (2), and at least one feeding device for feeding the steam (3) into the pyrolysis reactor (2), e.g. from a bottom of the pyrolysis reactor.

In the pyrolysis reactor (2), the plastic containing material and the steam are mixed to form a mixture. The temperature of 450-650° C., e.g. 480-550° C. or at or around 500° C., can be used during the catalytic pyrolysis. Further, the catalyst comprises at least $Al_2O_3$, $ZrO_2$ and/or aluminium silicate, and further the catalyst may comprise sand. A fluidizing gas is used in the fluidized bed pyrolysis reactor (2). The steam (3) can be used at least partly as the fluidizing gas in the reactor. Alternatively, the fluidizing gas comprises nitrogen, and the steam is subjected separately into the pyrolysis reactor. During the pyrolysis the plastic containing material is converted to the hydrocarbon product (4) comprising wax. If the product (4) is in the gaseous form (4a), such as pyrolysis gas, the product can be treated by a condensation (5) for forming a product (4b).

Example 1

In this example, plastic containing material was treated in a fluidized bed pyrolysis reactor which comprises an inert bed material (SiC) (B) or $Al_2O_3$ as a mildly acidic catalyst. The plastic containing material, which comprises polypropylene, was pyrolyzed.

In this example, the plastic containing material was pyrolyzed with steam by using a catalytic pyrolysis with the $Al_2O_3$ catalyst. A mixture of nitrogen (N) and steam (S) was used as a fluidizing gas. Temperature was 600° C. during the catalytic pyrolysis, and residence time was 1 second.

In comparative experiments, the pyrolysis was carried out without the steam or without the $Al_2O_3$ catalyst, as presented in table 1. Temperature was 600° C., and residence time was 1 second. The process conditions and compositions of the products are presented in Table 1.

TABLE 1

| Bed material/catalyst | $Al_2O_3$ catalyst | Comparative experiment, $Al_2O_3$ catalyst | Comparative experiment, B (Inert, SiC) |
|---|---|---|---|
| Process conditions | | | |
| Fluidizing gas | N + S | N | N + S |
| Temperature, ° C. | 600 | 600 | 600 |
| Residence time, s | 1 | 1 | 1 |
| Product composition, mass balance, wt % dry basis | | | |
| Char [1)] | −0.1 | 0.0 | −1.1 |
| Pyrolysis gases | 14.6 | 18.5 | 26.4 |
| Waxes + liquids | 79.8 | 57.3 | 57.9 |
| Waxes | 79.8 | 38.7 | 57.9 |
| Liquids | 0.0 | 18.6 | 0.0 |
| Mass balance closure | 94.3 | 75.8 | 83.2 |

In the table,
B is inert bed material,
S is steam, and
N is nitrogen.
[1)] Char yield on the bed material is calculated by weighting the bed material before and after the experiment.

In the experiments of this test the effect of bed material and the effect of steam were compared. From the test it was observed that the plastic containing material can be converted effectively to the hydrocarbon products comprising the wax, especially when the $Al_2O_3$ catalyst and the mixture of nitrogen and steam were used in the catalytic pyrolysis. Further, it was observed that a yield of the wax can be increased. The best wax yield was achieved when the steam in the fluidizing gas and the $Al_2O_3$-catalyst were used.

The pyrolysis reactor, inlet, feeding devices, and other devices and equipments of the process used in FIG. 1 are known per se in the art, and therefore they are not described in any more detail in this context.

The method and apparatus are suitable in different embodiments for producing hydrocarbon products, which comprise wax, from different plastic containing waste materials by means of catalytic pyrolysis process.

The invention is not limited merely to the examples referred to above; instead many variations are possible within the scope of the inventive idea defined by the claims.

The invention claimed is:

1. A method for producing a hydrocarbon product from plastic containing material, wherein the method comprises steps:
   - subjecting the plastic containing material into a pyrolysis reactor,
   - feeding steam into the pyrolysis reactor, and
   - pyrolyzing the plastic containing material in the presence of the steam by using a catalytic pyrolysis with a mildly acidic catalyst which contains $Al_2O_3$ to convert the plastic containing material to the hydrocarbon product comprising wax, wherein the hydrocarbon product comprises 40-90 wt-% wax, and residence time is 0.5-3.0 seconds in the catalytic pyrolysis.

2. The method according to claim 1, wherein the wax is paraffin wax.

3. The method according to claim 1, wherein the $Al_2O_3$ catalyst is formed from sandblast material.

4. The method according to claim 1, wherein the catalyst contains aluminium silicate formed from aluminium oxide and silicon dioxide.

5. The method according to claim 1, wherein the catalyst contains $ZrO2$.

6. The method according to claim 1, wherein the steam is fed from a bottom of the pyrolysis reactor.

7. The method according to claim 1, wherein the mildly acidic catalyst is added as a fresh makeup catalyst feed into the pyrolysis reactor.

8. The method according to claim 1, wherein the plastic containing material and the steam are mixed to form a mixture in the pyrolysis reactor.

9. The method according to claim 1, wherein temperature is 450-650° C. during the catalytic pyrolysis in the pyrolysis reactor.

10. The method according to claim 1, wherein the pyrolysis reactor is a fluidized bed reactor.

11. The method according to claim 1, wherein the steam is used at least partly as a fluidizing gas.

* * * * *